(12) United States Patent
Bonnain et al.

(10) Patent No.: US 6,360,873 B1
(45) Date of Patent: Mar. 26, 2002

(54) ARTICLE GROUPING MECHANISM

(75) Inventors: Jean-Christophe Bonnain; Jean-Jacques Dussart, both of Chateauroux (FR)

(73) Assignee: The Mead Corporation, Dayton, OH (US)

( * ) Notice: Subject to any disclaimer, the term of this patent is extended or adjusted under 35 U.S.C. 154(b) by 0 days.

(21) Appl. No.: 09/509,071

(22) PCT Filed: Sep. 21, 1998

(86) PCT No.: PCT/US98/19651

§ 371 Date: May 26, 2000

§ 102(e) Date: May 26, 2000

(87) PCT Pub. No.: WO99/14122

PCT Pub. Date: Mar. 25, 1999

(30) Foreign Application Priority Data

Sep. 19, 1997 (GB) ............................................. 9719949

(51) Int. Cl.[7] ........................ B65B 21/06; B65G 47/28
(52) U.S. Cl. .................... 198/419.3; 198/626.5
(58) Field of Search ........................ 198/418.7, 419.3, 198/626.1, 626.3, 626.5

(56) References Cited

U.S. PATENT DOCUMENTS 4,856,956 A * 8/1989 Zur .............................. 414/280
5,657,615 A * 8/1997 Muller ..................... 198/419.3

FOREIGN PATENT DOCUMENTS

| DE | 195 05 997 A1 | * | 8/1996 |
| EP | 0 126 553 | * | 11/1984 |
| EP | 0 708 028 | * | 4/1996 |

* cited by examiner

Primary Examiner—Christopher P. Ellis
Assistant Examiner—Mark A. Deuble
(74) Attorney, Agent, or Firm—Thomas A. Boshinski

(57) ABSTRACT

A grouping mechanism and method for grouping articles delivered to the mechanism from an infeed stream at an infeed end of a packaging machine, which mechanism comprises a pair of opposed spacer elements, each said spacer element adapted to engage at least one article from the infeed stream and to convey said article through a working reach of said mechanism and transfer means being provided to return each said spacer element along a return reach such that they are returned upstream of said working reach.

11 Claims, 5 Drawing Sheets

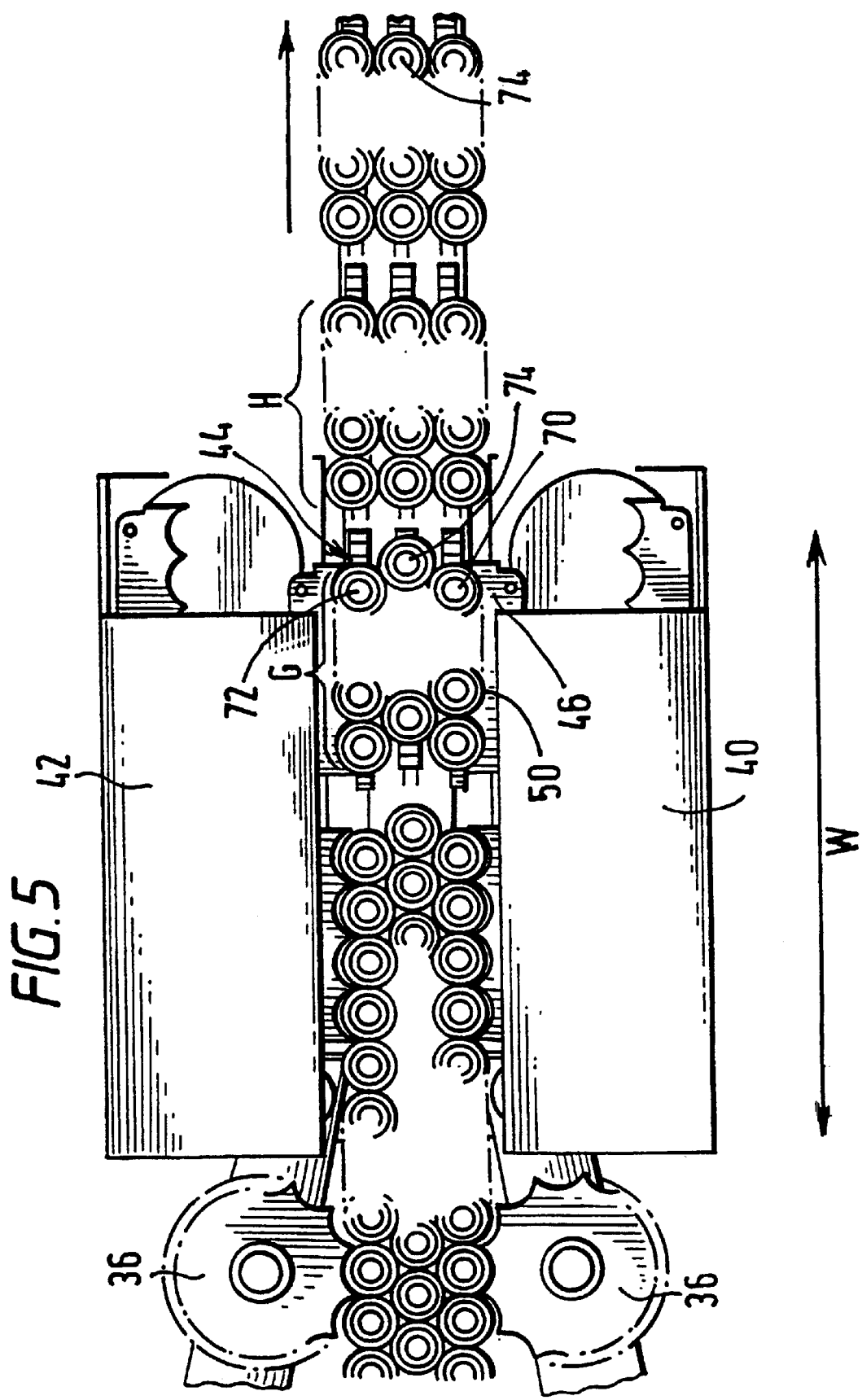

ARTICLE GROUPING MECHANISM

This invention relates to packaging of primary articles such as cans and bottles in multiple packaged cartons and is more particularly concerned with feeding such cartons from a hopper and for initiating and then completing a loading operation of cartons in sequence.

A majority of known packaging machines are dedicated machines which construct only one type of carton. Therefore, modern bottling plants are required to use a plurality of packaging machines to package different carton types, each machine taking up considerable floor space and being expensive to both purchase and operate.

A limited number of packaging machines are capable of packaging different sizes of one carton, for example, six, eight or twelve bottles of a wraparound carton. All such machines require adjustment when switching from one size or type of carton to another. This adjustment includes the manual removal of all of the cartons within the packaging machine and possibly the mechanical adjustment of components in the machine. During this changeover period, which can be thirty minutes or more, a machine cannot be used (known as "downtime"), which is an expensive delay in a bottling plant. Such a delay may even result in downtime for the entire bottling line, not just the packaging machine, if problems arise during the changeover procedure.

The present invention can be used with a packaging machine described in a corresponding application (applicant's reference D-7725). It is envisaged that the present invention can be used in various other types of packaging machine. Alternatively, the grouping mechanism of the present invention can be sold as an individual module to be fitted to new equipment or to existing equipment on a retro fit basis.

More particularly, this invention relates to a mechanism for grouping together a plurality of articles from an infeed stream at an infeed end of a packaging machine and is particularly useful for grouping together a plurality of cans or bottles in a multiple packaging machine.

In a known spacer and conveying mechanism disclosed in EP 0 126 553, or EP 0 708 028, a series of spacer elements are spaced apart at fixed locations on the endless chains, each spacer element being configured to engage a plurality of articles from an infeed stream of articles and convey those articles downstream of the machine. The spacing between each spacer element corresponds to the spacing between successive groups of articles. GB A 974 995 discloses a grouping mechanism for grouping articles into package units which comprises a first pair of chains which have lugs spaced apart at fixed intervals for engaging articles at an infeed end of the apparatus. The pair of chains are mounted on opposite sides of a pair of fixed support plates which together with the lugs cooperate to divide the array of articles at the infeed into groups of fixed separation and propel the groups towards a second pair of chains also having lugs spaced apart at fixed intervals. The second pair of chains has a greater downstream velocity compared to the first pair of chains. The upstream article of a group of articles is engaged by a lug of the second pair of chains thereby forcing the groups of articles forward at a greater speed than that determined by the first pair of chains.

The present invention seeks to overcome the commercial disadvantages of known packaging machines and spacing mechanism by providing a grouping mechanism which is able to group articles for loading into more than one type of carton. Further, the invention is capable of switching from one configuration of grouped articles to another for loading into different carton types or sizes with minimum downtime. Further, the modular nature of the present invention enables a fully flexible machine to be constructed which overcomes, or at least mitigates, the problems of known machines.

One aspect of the invention provides a grouping mechanism for grouping articles to be loaded into a carton and delivered to the mechanism from an infeed stream at an infeed end of a packaging machine, which mechanism comprises a pair of opposed spacer elements, each spacer element adapted to engage at least one article from the infeed stream and to convey the article through a working reach of the mechanism and transfer means being provided to return each spacer element along a return reach such that they are returned upstream of the working reach. There further comprises adjustment means to increase the spacing between said opposed spacer elements whereby a third article intermediate and juxtaposed said engaged articles in conveyed by said spacer elements.

According to yet another optional feature of this aspect of the invention, the third article may lead the engaged articles during the working reach and wherein article alignment means may be provided to move the third article into lateral alignment with the engaged articles when the engaged articles are disengaged from the spacer element.

According to still another optional feature of this aspect of the invention, the article alignment means may be provided by opposed panels of the carton in contact with the articles to guide the articles into alignment.

According to another optional feature of this aspect of the invention, there may further comprise adjustment means to adjust the spacing between the spacer elements to receive two or three rows of articles.

According to an optional feature of this aspect of the invention, the spacer element comprises a part cylindrical recess to receive a portion of the article being conveyed.

According to a further optional feature of this aspect of the invention each spacer element may be mounted on a cam track, wherein each cam track provides a path for the spacer elements to maintain the recesses parallel to the articles during the engagement.

According to an yet another optional feature of this aspect of the invention the spacer element may further comprise a second part cylindrical recess to receive a portion of a second article to be conveyed in a grouped arrangement with the first article.

According to another optional feature of this aspect of the invention regulating means may be provided to control the flow of articles at the infeed end, the regulating means further comprising means to control the pressure of the articles into the machine and means to determine the correct number of articles for each carton.

According to yet another optional feature of this aspect of the invention the means to control the pressure of the articles comprises an infeed star wheel.

A second aspect of the invention provides a method of grouping articles delivered from an infeed stream of a packaging machine which method comprises engaging successive articles with spacer elements from the infeed stream so that those articles are located relative to one another during feed movement of the articles so that one group of articles becomes advanced with respect to and thereby spaced from the next succeeding group of articles while the spacer elements move along the feed path of the articles and thereafter, returning the spacer elements upstream such that they are appropriately spaced one from the next for engagement with successive articles in the infeed stream. The group of articles comprise two outer rows advanced by the spacer element and a central row intermediate the outer rows, each row having at least one article and further comprising the step that the central row abuts a leading portion of an article of each advancing outer row thereby to advance the central row.

According to still another optional feature of this aspect of the invention, after the articles leave engagement with the spacer elements there may further comprise the step of moving the outer rows and central row into lateral alignment for loading into a carton.

An embodiment of the invention will now be described by way of example with reference to the accompanying drawings in which:

FIG. 5 is a plan view of the article grouping mechanism for three rows.

A machine according to the present invention is capable of grouping articles in different configurations for loading in a variety of carton types, for example, fully enclosed, wraparound and basket type cartons. Any reference in this specification to carton type includes different sizes of a particular carton style. For example, the mechanism can load fully enclosed cartons for eight or twelve articles configured in 2×4 and 3×4 respectively.

Figure 1:
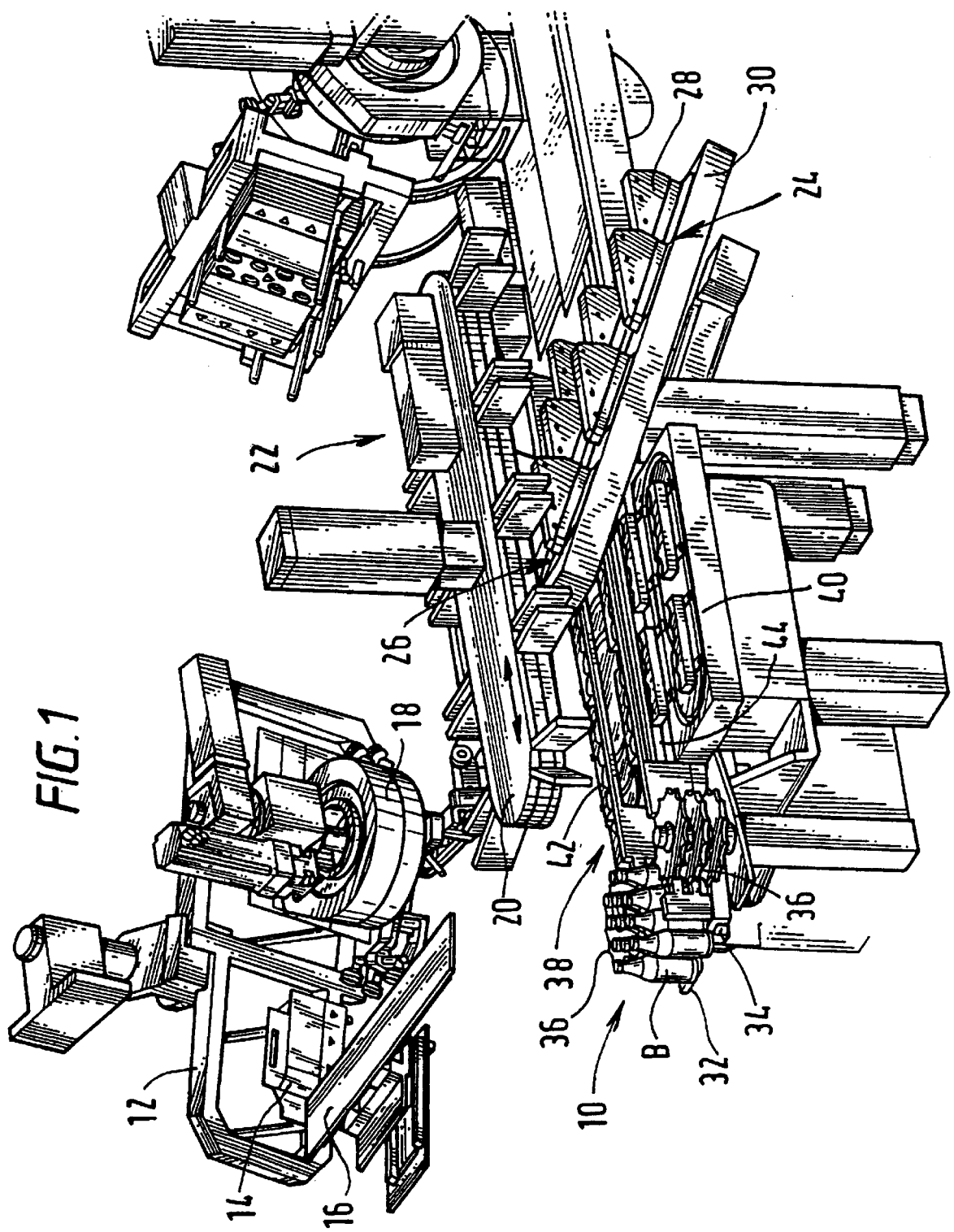
FIG. 1 is a perspective view of an upstream end of a packaging machine incorporating the article grouping mechanism of the present invention.

Referring to FIG. 1 of the drawings there is shown a machine 10 for packaging cartons formed from a (unitary) blank of paperboard or similar sheet material. The upstream end of the machine includes a dual hopper 12 in which a multiplicity of cartons 14 in a collapsed condition are held ready for processing. A back feeder 16 of the type referred to in corresponding application (Applicant's reference D-7723) and a rotary vacuum feeder 18 are positioned adjacent the dual hopper 12. The rotary vacuum feeder 18 transfers sequentially cartons from the hopper 12 to a paper feed chain 20. The back feeder 16 comes into contact with the carton during its orbital path and separates opposing walls to part erect the carton. A paper feed chain 20 is provided to complete the carton set up and to transfer cartons downstream to the loading station 22.

Thereafter, carton engagement with the paper feed chain 20 is gradually transferred as the cartons move downstream to a pair of side lug chain sets 24 shown in FIG. 1. Each side lug chain set 24 is of similar construction and includes endless chains 26 having a plurality of guide pin lugs 28 which engage the opposed panels of the carton 14 to retain it in the set up condition as it moves downstream. The endless chain sets 24 are mounted on table 30 which are downwardly inclined towards the loading station 22.

Articles such as bottles B or cans are fed into the machine 10 by a conveyor for example an infeed conveyor belt 32 moving on a support platform 34. In this embodiment, three conveyors are provided, each conveyor moving one row of articles. The infeed stream of articles in side by side abutting relationship are introduced to the infeed end of a multiple packaging machine. The line pressure of the articles is controlled by a pair of infeed star wheels 36, as is well known. The articles then enter a grouping station 38 which groups the correct number of articles per carton by means of a series of article grouping assemblies 40, 42.

These assemblies 40, 42 also control the flow of the articles so that they can be introduced to the carton at the same rate as the carton flow. Thereafter, the grouped articles are moved to the loading station 22 by means of an article conveyor 44.

The construction of the article grouping assemblies 40, 42 outlined above, will now be described with reference to FIGS. 2 and 3. In this embodiment a grouping assembly 40, 42 is positioned on each side of the article conveyor 44. Both grouping assemblies 40, 42 are identical in construction, and therefore, only the nearside assembly 40 is described in detail. The assembly 40 includes four spacer elements 46 mounted onto an endless chain 48. The spacer element 46 comprises four part cylindrical recesses 50 positioned one to next. Each recess is shaped substantially to conform to a peripheral wall portion of a bottle B or can which the recess is to engage.

The spacer element 46 is connected to the endless chain 48 by suitable attachment means, for example, a bearing so that the spacer element can rotate about the attachment. Cam followers (not shown) extend from each end of the spacer element. The endless chain 48 is mounted onto a table 52 supported on a platform and base 54.

Figure 3:
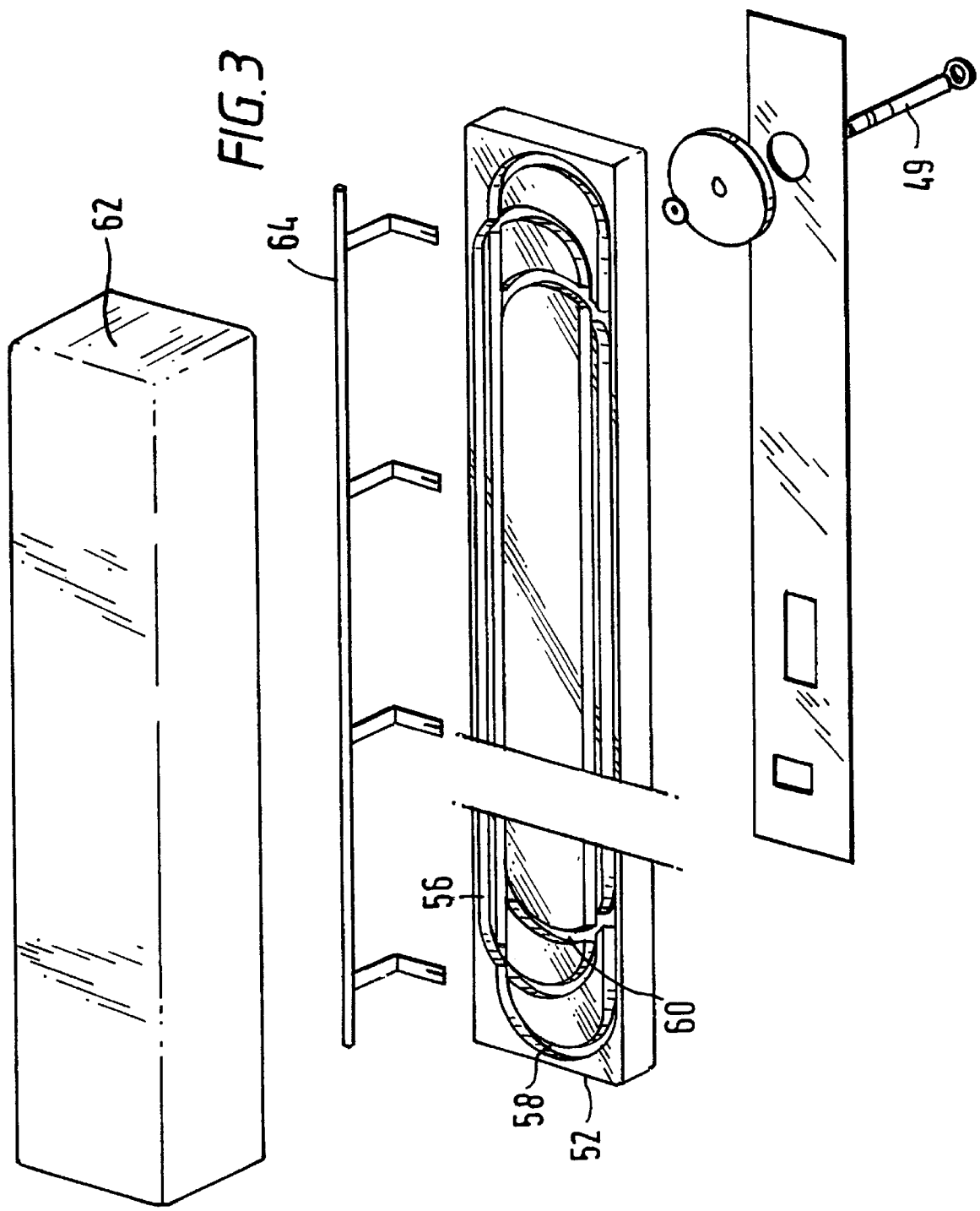
FIG. 3 is an exploded view of the support platform used with the article grouping mechanism of the invention.

As illustrated in FIG. 3, the table 52 includes an oval recess 56 to receive the endless chain 48 and a cam track 58, 60 to receive the cam followers. The endless chain set 48 is driven by a motor for example a servo motor, through a drive shaft 49. As each spacer element 46 moves along the path of the cam track 58, 60, the recesses 50 are maintained in a plane parallel to the article conveyor 44. This arrangement allows the spacer elements 46 to be moved laterally, designated by letter X at each end of the table 52 to assist in the smooth engagement and disengagement of the articles B in the recesses 50. In this embodiment, a guard 62 and a guide rail 64 are also provided to minimise unwanted movement of the articles.

It will be understood that the grouping mechanism 40, 42 of the invention has been illustrated with reference to a specific embodiment and that numerous modifications are possible within the scope of the invention. The grouping mechanism is able to process cartons comprising numerous configurations of groups of articles covering a range of carton size and shape, for example, four, six, eight and twelve bottles without undue time being spent in adjusting the mechanism.

Figure 2:
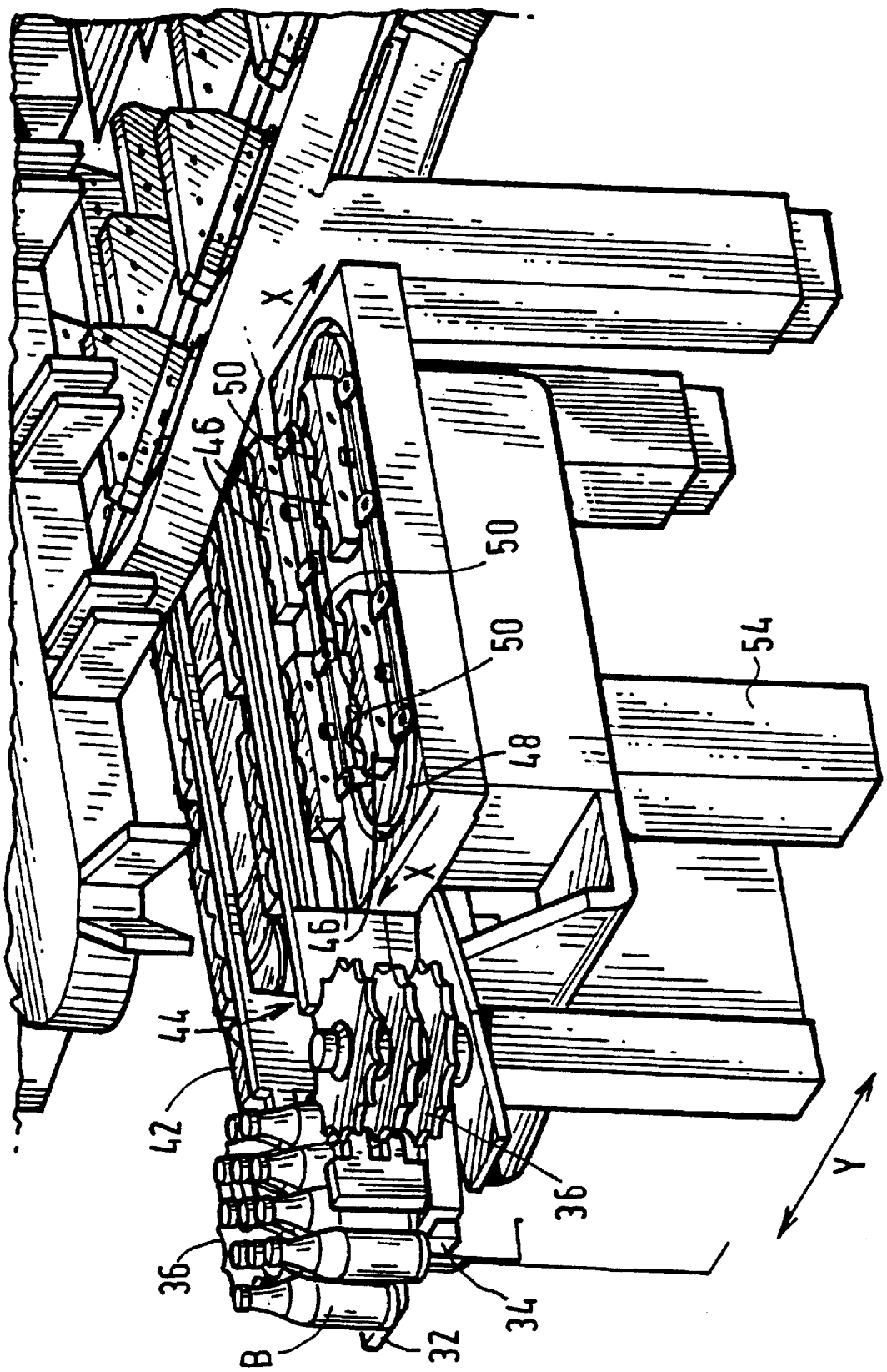
FIG. 2 is a perspective view illustrating the article grouping mechanism of the present invention.
Figure 4:
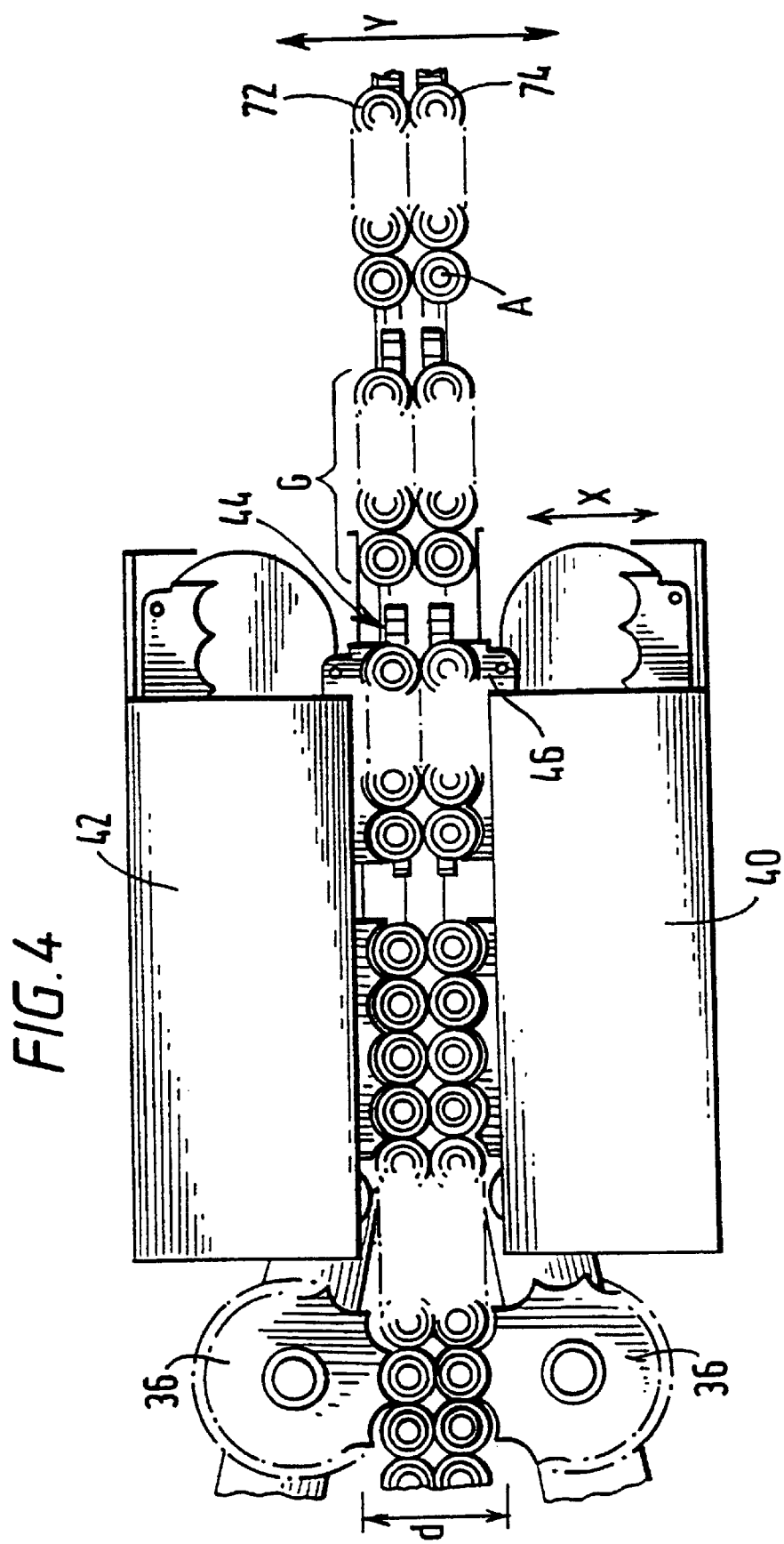
FIG. 4 is a plan view of the article grouping mechanism for two rows.

Thus, the assemblies are mounted onto platforms which are moveable in a direction designated by letter Y shown in FIGS. 2 and 4, so that one or both of the assemblies 40, 42 can be moved toward or away from the article conveyor 44 according to whether two or three rows of articles B are required. In this embodiment, the near side assembly is fixed and the far side grouping assembly 42 is moved towards the near side assembly 40 when it is desired to package two rows of articles 70, 72, as shown in FIG. 4. The distance between the infeed star wheels is also narrowed to ensure that the article flow is restricted to two rows, and only two of the three article conveyors 44 are operative.

For those cartons requiring three rows of articles, the distance d between each grouping assembly 40, 42 is increased. Likewise, the infeed star wheels can also be moved further apart . For the arrangement shown in FIG. 5, the grouping assemblies are used to grip the two outer rows of articles 70, 72 and the articles making up the centre row 74 are positioned in the void between adjacent articles in each of the outer rows 70, 72. As shown in FIG. 5, the centre row leads the outer rows by half a bottle/can diameter. Thus, the central row is moved forward to the end of the working reach W by the outer rows of articles 70, 72.

The present invention also provides for adjustment to the number of articles per row by controlling the number of articles being fed by the star wheels 36 into the grouping station 38. It is envisaged that rows of one, two or three articles can be selected by utilising a corresponding number of recesses 50. If it is desired to increase the number of articles to five or more per row, then the endless chain set 46 illustrated in this embodiment, can be interchanged with another chain set comprising a spacer element with more recesses.

The articles gradually leave contact with the gripper assembly 38 and are transferred to the loading station 22 by means of the article conveyor 44.

At the loading station 22 illustrated in FIG. 1, the cartons are introduced to the group of articles B from above as the carton 10 and article group G are moved forward in unison. The carton 10 is lowered onto the group G by the downward incline of the endless chains sets. For grouped articles, comprising three rows 70, 72, 74 it is preferred to alter the configuration from that designated by letter G to the configuration designated by letter H achieved by suitable guide means. In this embodiment, the change in configuration is achieved when end panels of the descending carton come into contact with leading and trailing articles, so that panels guide the bottles into lateral and longitudinal alignment as they are loaded into the carton showing in FIG. 5 at H. Of course, it is envisaged that the configuration adopted depends upon the type of carton being loaded.

In another class of embodiments, lugs mounted to side chain sets or flight bars, known in the art are introduced to the grouped articles at the end of the working reach W to effect the change in configuration from G to H.

Once the cartons have been loaded with articles, they are transferred by means of the article conveyor and/or pressure belt to a further set of endless chains with side lugs which are used to transfer the carton to the outfeed end of the machine. During this stage, the base panels are folded around to the underside of the carton and are interconnected by a locking mechanism known in the art.

According to this invention the speed of operation of the apparatus is improved as well as its efficiency and durability as the carton is moved from a collapsed position to a fully set up condition. Of course, the final set up operation is due in part to engagement with a back feeder and a corner of the carton with the lugs which then affects complete and final set up of a carton whilst being held by the suction cup.

While the preferred embodiment described herein is for loading bottles into cartons, it will be recognised that the invention is not limited to cartons for bottles. The invention may be used with machines for packaging cans, paperboard "bricks" and other containers into cartons.

Moreover, while the preferred embodiment described herein is shown as part of a machine for loading containers into vertically-loaded sleeve-type carton, the invention is not limited to cartons of this type. As will be recognised by those skilled in the art, the invention may be used with wrap-around or end-loaded cartons.

What is claimed is:

1. A grouping mechanism for grouping articles to be loaded into a carton and delivered to the mechanism from an infeed stream at an infeed end of a packaging machine, which mechanism comprises a pair of opposed spacer elements, each said spacer element adapted to engage at least one article from the infeed stream and to convey said article through a working reach of said mechanism and transfer means being provided to return each said spacer element along a return reach suchthat they are returned upstream of said working reach characterised in that there further comprises adjustment means to increase the spacing between said opposed spacer elements whereby a third article intermediate and juxtaposed said engaged articles is conveyed by said spacer elements.

2. A grouping mechanism according to claim 1 wherein said third article leads said engaged articles during the working reach and wherein article alignment means is provided to move said third article into lateral alignment with said engaged articles when said engaged articles are disengaged from said spacer element.

3. A grouping mechanism according to claim 2 wherein said article alignment means is provided by opposed panels if said carton in contact with said articles to guide said articles into alignment.

4. A grouping mechanism as claimed in any of claims 1 to 3 wherein there further comprises adjustments means to adjust the spacing between said spacer elements to receive two or three rows of articles.

5. A grouping mechanism according to any of claims 1 to 3 wherein said spacer element comprises a part cylindrical recess to receive a portion of said article being conveyed.

6. A grouping mechanism according to claim 1 wherein each said spacer elements is mounted in a cam track, wherein each said cam track provides a path for said spacer elements to maintain said recesses parallel to said articles during said engagement.

7. A grouping mechanism according to claim 1, wherein said spacer element further comprises a second part cylindrical recess to receive a portion of a second article to be conveyed in a grouped arrangement with said first article.

8. A grouping mechanism according to claim 1, wherein regulating means is provided to control the flow of articles at said infeed end, said regulating means further comprising means to control the pressure of said articles into the machine and means to determine the correct number of articles for each carton.

9. A grouping mechanism according to claim 8 wherein said means to control the pressure of said articles comprises an infeed star wheel.

10. A method of grouping articles delivered from an infeed stream of packaging machine which method comprises engaging successive articles with spacer elements from the infeed stream so the those articles are located relative to one another during feed movement of the articles so that one group of articles becomes advanced with respect to and thereby spaced from the next succeeding groups of articles while the spacer elements move along the feed path of said articles and thereafter, returning the spacer elements upstream such that they are appropriately spaced one from the next for engagement with successive articles in said infeed stream characterised in that said group of articles comprises two outer rows advances by said spacer elements and a central row intermediate said outer rows, each said row having at least one article and further comprising the step that said central row abuts a leading portion of an article of each said advancing outer row thereby to advance said central row.

11. A method of claim 10 after the articles leave engagement with said spacer elements further comprising the step of moving the outer rows and central row into lateral alignment for leading into a carton.

* * * * *